(12) United States Patent
Iwabuchi et al.

(10) Patent No.: US 9,481,210 B2
(45) Date of Patent: Nov. 1, 2016

(54) PNEUMATIC TIRE

(75) Inventors: Sotaro Iwabuchi, Kodaira (JP);
Takaaki Kojima, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1078 days.

(21) Appl. No.: 13/581,133

(22) PCT Filed: Feb. 17, 2011

(86) PCT No.: PCT/JP2011/053394
§ 371 (c)(1),
(2), (4) Date: Aug. 24, 2012

(87) PCT Pub. No.: WO2011/105281
PCT Pub. Date: Sep. 1, 2011

(65) Prior Publication Data
US 2012/0318419 A1 Dec. 20, 2012

(30) Foreign Application Priority Data

Feb. 26, 2010 (JP) .................. 2010-042154
Feb. 26, 2010 (JP) .................. 2010-042155
Feb. 26, 2010 (JP) .................. 2010-042156

(51) Int. Cl.
*B60C 11/117* (2006.01)
*B60C 11/03* (2006.01)
(Continued)

(52) U.S. Cl.
CPC ........ *B60C 11/0304* (2013.04); *B60C 11/1323* (2013.04); *B60C 11/0309* (2013.04);
(Continued)

(58) Field of Classification Search
CPC . B60C 11/0304; B60C 11/032; B60C 11/13; B60C 11/1307; B60C 11/1323; B60C 11/12; B60C 11/0306; B60C 11/0309; B60C 2011/0381; B60C 11/0341; B60C 2011/0353; B60C 2011/0355; B60C 2011/0374; B60C 2011/0376; B60C 2011/0379; B60C 2011/1338; B60C 2011/1361; B60C 2011/0369
USPC ................ 152/209.8, 209.9, 209.17, 209.21, 152/209.19, 209.18
See application file for complete search history.

(56) References Cited

U.S. PATENT DOCUMENTS 4,649,975 A  3/1987  Kogure et al.
5,851,322 A  12/1998 Hayashi
(Continued)

FOREIGN PATENT DOCUMENTS

CN  101360619 A  2/2009
DE  29825135 U1  5/2005
(Continued)

OTHER PUBLICATIONS

Machine translation of JP07-096716 (no date).*
(Continued)

*Primary Examiner* — Michael H Wilson
*Assistant Examiner* — Philip N Schwartz
(74) *Attorney, Agent, or Firm* — Sughrue Mion, PLLC

(57) ABSTRACT

Plural lug grooves are formed that extend from an outermost circumferential direction groove towards a tire equatorial plane side and are disposed sloped with respect to the tire equatorial plane at intervals along the tire circumferential direction. Arc shaped communication grooves are formed in segment land portions arising from a land portion being segmented in the tire circumferential direction by the lug grooves. The communication grooves communicate between the lug grooves adjacent to each other in the tire circumferential direction.

11 Claims, 12 Drawing Sheets

(51) Int. Cl.
*B60C 11/13* (2006.01)
*B60C 11/12* (2006.01)

(52) U.S. Cl.
CPC ....... *B60C 11/12* (2013.01); *B60C 2011/0341* (2013.04); *B60C 2011/0369* (2013.04); *B60C 2011/0374* (2013.04); *B60C 2011/0376* (2013.04); *B60C 2011/0379* (2013.04); *B60C 2011/0381* (2013.04); *B60C 2011/1338* (2013.04)

(56) References Cited

U.S. PATENT DOCUMENTS

| | | | |
|---|---|---|---|
| 2001/0017177 A1 | 8/2001 | Himuro | |
| 2001/0035244 A1 | 11/2001 | Diensthuber et al. | |
| 2004/0221936 A1 | 11/2004 | Kaiser et al. | |
| 2007/0017618 A1* | 1/2007 | Miyasaka | B60C 11/0302 152/209.18 |
| 2007/0215258 A1* | 9/2007 | Fukunaga | B60C 11/0302 152/209.18 |
| 2009/0272474 A1 | 11/2009 | Nagai et al. | |

FOREIGN PATENT DOCUMENTS

| | | | |
|---|---|---|---|
| EP | 1106393 | A2 | 6/2001 |
| EP | 1964691 | A1 | 9/2008 |
| JP | 61-16111 | A | 1/1986 |
| JP | 7-96716 | A | 4/1995 |
| JP | 9-207521 | A | 8/1997 |
| JP | 11-321240 | A | 11/1999 |
| JP | 3222953 | B2 | 10/2001 |
| JP | 2003-154812 | A | 5/2003 |
| JP | 2003326920 | A | 11/2003 |
| JP | 2004-17863 | A | 1/2004 |
| JP | 2004-284577 | A | 10/2004 |
| JP | 200553365 | A | 3/2005 |
| JP | 2007112218 | A | 5/2007 |
| JP | 2008-44441 | A | 2/2008 |
| WO | 2007/072824 | A1 | 6/2007 |

OTHER PUBLICATIONS

Machine translation of JP2003-154812 (no date).*
Machine translation of JP2004-017863 (no date).*
Communication dated Jun. 5, 2015, issued by the European Patent Office in counterpart Application No. 11747245.6.
Chinese Office Action, dated May 23, 2014, issued in corresponding Chinese Patent Application No. 201180011175.7.
International Search Report for PCT/JP2011/053394 dated May 24, 2011.
Communication dated Oct. 20, 2015 from the European Patent Office in counterpart application No. 11747245.6.

* cited by examiner

FIG.12

| | EXAMPLE 1 | EXAMPLE 2 | EXAMPLE 3 | EXAMPLE 4 | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|---|
| PROFILE | | | | | | | | |
| NOTE | WIDTH: 50% HEIGHT:50% | WIDTH: 30% HEIGHT:50% | WIDTH: 50% HEIGHT:30% | WIDTH: 15% HEIGHT:50% | WIDTH: 75% HEIGHT:50% | WIDTH: 100% HEIGHT:50% | WIDTH: 50% HEIGHT:75% | WIDTH: 50% HEIGHT:100% |
| OCCUPIED SURFACE AREA (%) | 13.0 | 7.8 | 7.8 | 3.9 | 19.5 | 26.0 | 19.5 | 26.0 |
| WATER EXPELLING PERFORMANCE | 98.0 | 98.0 | 98.0 | 99.0 | 96.0 | 95.0 | 97.0 | 96.0 |
| PERFORMANCE ON SNOW | 105.0 | 102.0 | 103.0 | 100.0 | 108.0 | 110.0 | 106.0 | 107.0 |

| | COMPARATIVE EXAMPLE 5 | COMPARATIVE EXAMPLE 6 | COMPARATIVE EXAMPLE 7 | COMPARATIVE EXAMPLE 8 | COMPARATIVE EXAMPLE 9 | COMPARATIVE EXAMPLE 10 |
|---|---|---|---|---|---|---|
| PROFILE | | | | | | |
| OCCUPIED SURFACE AREA (%) | 26.0 | 26.0 | 26.0 | 20.0 | 53.0 | 0 |
| WATER EXPELLING PERFORMANCE | 95.0 | 95.0 | 95.0 | 97.0 | 85.0 | 100.0 |
| PERFORMANCE ON SNOW | 109.0 | 106.0 | 108.0 | 104.0 | 120.0 | 100.0 |

PNEUMATIC TIRE

CROSS REFERENCE TO RELATED APPLICATIONS

This application is a National Stage of International Application No. PCT/JP2011/053394 filed Feb. 17, 2011, claiming priority based on Japanese Patent Application Nos. 2010-042154 filed Feb. 26, 2010, 2010-042155 filed Feb. 26, 2010 and 2010-042156 filed Feb. 26, 2010, the contents of all of which are incorporated herein by reference in their entirety.

TECHNICAL FIELD

The present invention relates to a pneumatic tire, and in particular to a pneumatic tire capable of all-season use.

BACKGROUND ART

All-season tires demand a high degree of balance to be achieved between running performance in the dry and wet, and performance on snow.

As a conventional all-season tire tread pattern, a typical tread pattern is disclosed, for example, in Japanese Patent 3222953.

DISCLOSURE OF INVENTION

Technical Problem

Current patterns are configured to attempt to secure performance on snow using a method of incorporating lug grooves having a comparatively large angle with respect to the circumferential direction, and increasing the number of fine grooves uniformly incorporated in blocks. Such methods attempt to secure snow performance, however such methods lead to a reduction in block rigidity and a reduction in dry and wet drivability when attempting to improve the performance on snow. There are also disadvantages with respect to water expelling performance due to the angle of the lug grooves being close to the tire width direction.

The present invention addresses resolution of the above issues, and an object of the present invention is to provide a pneumatic tire capable of raising performance on snow while still securing dry performance and wet performance.

Solution to Problem

The present invention is made in consideration of the above circumstances, and a pneumatic tire of a first aspect includes: plural circumferential direction grooves provided to a tread and extending along the tire circumferential direction; a land portion configured between an outermost circumferential direction groove disposed furthest to the outside in one tire width direction, and a second circumferential direction groove that is adjacent to the outermost circumferential direction groove; plural lug grooves that extend from the outermost circumferential direction groove towards the tire equatorial plane side and are disposed sloped with respect to the tire equatorial plane at intervals along the tire circumferential direction; and arc shaped communication grooves formed in segment land portions arising from the land portion and being segmented in the tire circumferential direction by the lug grooves, the communication grooves communicating between the lug grooves adjacent to each other in the tire circumferential direction.

Explanation follows regarding operation of the pneumatic tire of the first aspect.

First, fundamental water expelling performance and straight line stability during dry or wet running is secured due to disposing the plural circumferential direction grooves in the tread extending along the tire circumferential direction.

A higher water expelling performance can be exhibited than with a studless tire due to disposing the plural lug grooves sloped with respect to the tire equatorial plane from the outermost circumferential direction groove towards the tire equatorial plane side. Furthermore noise generation can be suppressed.

Edge portions having both tire circumferential direction components and tire width direction components are provided to the segment land portions due to forming the arc shaped communication grooves in the segment land portions segmented by the lug grooves. The cornering performance, braking performance and traction performance on snow can accordingly be raised. Longer communication grooves can also be formed due to the arc shape of the communication grooves, in comparison to cases with a straight line shape. The cornering performance, braking performance and traction performance on snow can accordingly be raised further.

In a pneumatic tire of a second aspect the depth of the communication grooves is shallower than the depth of the lug grooves.

By making the depth of the communication grooves shallower than the depth of the lug grooves an edge can be formed while still securing the rigidity of the segment land portions.

In a pneumatic tire of a third aspect the lug grooves are sloped at 20° to 60° with respect to the tire equatorial plane.

When the angle of the lug grooves with respect to the tire circumferential direction is less than 20° concern arises regarding deterioration in drivability due to the segment land portions becoming longer in the tire circumferential direction. However, when the angle of the lug grooves with respect to the tire circumferential direction exceeds 60° then advantages with respect to water expelling performance disappear. The angle of the lug grooves with respect to the tire equatorial plane is accordingly preferably set in the range of 20° to 60°.

A pneumatic tire of a fourth aspect further includes a step portion that is adjacent to the lug groove, that has a step face that is raised from the groove bottom of the lug groove by a lower amount than the tread surface of the segment land portion, and that is formed from the outermost circumferential direction groove towards the tire equatorial plane side, at the side of the segment land portions arising from the land portion being segmented in the tire circumferential direction by the lug grooves, where a corner portion on the outermost circumferential direction groove side is an acute angle.

Due to the step portion configured as described above, the rigidity of the segment land portions is raised and tilting over is suppressed while securing water expelling performance with the lug grooves.

In a pneumatic tire of a fifth aspect a jutting out width of the step portion into the lug groove is from 10% to 50% of the average groove width of the lug grooves.

When the jutting out width of the step portions into the lug grooves is less than 10% advantages with respect to rigidity of the segment land portions disappear. However when 50% is exceeded advantages with respect to water expelling performance with the lug grooves disappear. The jutting out width of the step portions into the lug grooves is accordingly preferably 10% to 50% of the average groove width of the lug grooves.

In a pneumatic tire of a sixth aspect a height of the step portion from the groove bottom of the lug groove is from 30% to 70% of the depth of the lug groove at the outermost circumferential direction groove side.

When the height from the groove bottom of the lug grooves is less than 30% of the depth of the lug grooves on the outermost circumferential direction groove side then the segment land portions cannot be efficiently suppressed from tilting over. When the height exceeds 70% of the depth of the lug grooves on the outermost circumferential direction groove side advantages with respect to water expelling performance with the lug grooves disappear. The height of the step portions from the groove bottoms of the lug grooves is accordingly preferably 30% to 70% of the depth of the lug grooves on the outermost circumferential direction groove side.

In a pneumatic tire of a seventh aspect the lug grooves are configured so as to be in communication with the second circumferential direction groove, and the second circumferential direction groove sides of the lug grooves are configured by shallow grooves that are shallower than at the outermost circumferential direction groove side.

The portion of the tread in the vicinity of the tire equatorial plane has higher ground contact pressure than at the shoulder side, and so the strength of the segment land portions can be efficiently raised by making the lug grooves shallower here, enabling steering stability to be secured.

Note that the groove bottom of the shallow groove may be in the same plane as the step face of the step portion or may be lower than the step face of the step portion.

In a pneumatic tire of an eighth aspect three circumferential direction grooves are formed in the tread, one of the circumferential direction grooves is disposed on one side of the tire equatorial plane and configures the outermost circumferential direction groove and the other two circumferential direction grooves are disposed on the other side of the tire equatorial plane.

Disposing the circumferential direction grooves as described above results in the land portion configured with the lug grooves being disposed on the tire equatorial plane where there is high ground contact pressure and so performance on snow can be raised.

In a pneumatic tire of a ninth aspect the lug grooves are curved in a direction such that the angle of slope with respect to the tire equatorial plane gradually increases towards the outermost circumferential direction groove.

According to the above configuration, the water expelling performance from the lug grooves can be made higher on progression towards the outermost circumferential direction groove.

In a pneumatic tire of a tenth aspect the lug grooves are curved in a direction such that the angle of a corner portion on the acute angle side adjacent to the outermost circumferential direction groove gets larger.

According to the above configuration, the separation distance from the lug grooves can be made shorter towards the outermost circumferential direction groove than in cases with a straight line form, enabling the water expelling performance to be raised.

In a pneumatic tire of an eleventh aspect shallow grooves that are shallower than the outermost circumferential direction groove side of the lug grooves are formed in the segment land portions to communicate between lug grooves that are adjacent to each other in the tire circumferential direction.

Lug grooves set with a comparatively small slope angle with respect to the tire circumferential direction are advantageous for water expelling performance, however they become disadvantageous for running on snow. However, by forming the shallow grooves in the land portions the disadvantages for running on snow can be compensated for, enabling the cornering performance, braking performance and traction performance on snow to be raised.

A pneumatic tire of a twelfth aspect includes a second land portion formed between the second circumferential direction groove and the circumferential direction groove on the opposite side to the outermost circumferential direction groove, wherein plural sound absorption sections, each including a resonance hollow portion and a communication groove that communicates between the resonance hollow portion and the second circumferential direction groove, are formed in the second land portion along the tire circumferential direction.

For the above sound absorption sections, setting the volume of the resonance hollow portions and the cross-sectional area and length of the communication groove, for example, according to the theoretical equations for a Helmholtz resonator, enables noise at specific frequencies to be reduced.

In a pneumatic tire of a thirteenth aspect at least one of the plural circumferential direction grooves is provided with projection portions that project out from a side wall of the row of land portions at one side and have a sloping face from the side wall to the groove bottom of the circumferential direction groove, and the height of the projection portions is from 30% to 70% of the groove depth of the circumferential direction groove provided with the projection portions, and the jutting out width of the projection portions into the circumferential direction groove is from 10% to 50% of the groove width of the circumferential direction groove provided with the projection portions.

The height of the projection portions in the above configuration is 30% to 70% of the groove depth of the circumferential direction groove provided with the projection portions, and the jutting out width of the projection portions into the circumferential direction groove is 10% to 50% of the groove width of the circumferential direction groove provided with the projection portions. When the height of the projection portions is less than 30% of the groove depth of the circumferential direction groove then braking performance and traction performance on snow cannot be obtained. When the height of the projection portions exceeds 70% of the groove depth of the circumferential direction groove then water expelling performance falls greatly. Therefore the height of the projection portions is set at 30% to 70% of the groove depth of the circumferential direction groove provided with the projection portions. When the jutting out width of the projection portions into the circumferential direction groove is less than 10% of the groove width of the circumferential direction groove provided with the projection portions then braking performance and traction performance on snow is not obtained. When the jutting out width of the projection portions into the circumferential direction groove exceeds 50% of the groove width of the circumferential direction groove provided with the projection portions then the water expelling performance falls greatly. The jutting out width of the projection portions into the circumferential direction groove is therefore from 10% to 50% of the groove width of the circumferential direction groove provided with the projection portions.

In a pneumatic tire of a fourteenth aspect the projection portions slope in the same direction as the lug grooves with respect to the tire equatorial plane, as viewed from the tread face side.

Due to the projection portions sloping with respect to the tire equatorial plane the projection portions jut out into the circumferential direction groove with components in both the tire circumferential direction and in the tire width direction, enabling the cornering performance, braking performance and traction performance on snow to be raised.

Effects of Invention

As explained, the pneumatic tire of the first aspect is configured as described above and so exhibits the excellent advantageous effect of enabling braking performance and traction performance on snow to be raised.

The pneumatic tire of the second aspect is configured as described above and so exhibits the excellent advantageous effect of enabling an edge to be formed in the tire width direction while still securing rigidity of the second land portion.

The pneumatic tire of the third aspect is configured as described above and so exhibits the excellent advantageous effect of enabling water expelling performance to be secured while suppressing deterioration in drivability.

The pneumatic tire of the fourth aspect is configured as described above and so exhibits the excellent advantageous effect of enabling the rigidity of the second land portions to be raised to suppress tilting over while still securing the water expelling performance with the lug grooves.

The pneumatic tire of the fifth aspect is configured as described above and so exhibits the excellent advantageous effect of enabling tilting of the segment land portions to be efficiently suppressed while securing water expelling performance with the lug grooves.

The pneumatic tire of the sixth aspect is configured as described above and so exhibits the excellent advantageous effect of enabling tilting of the segment land portions to be efficiently suppressed while securing water expelling performance with the lug grooves.

The pneumatic tire of the seventh aspect is configured as described above and so exhibits the excellent advantageous effect of enabling the strength of the segment land portions to be efficiently raised.

The pneumatic tire of the eighth aspect is configured as described above and so exhibits the excellent advantageous effect of enabling the performance on snow to be raised.

The pneumatic tire of the ninth aspect is configured as described above and so exhibits the excellent advantageous effect of enabling the water expelling performance from the lug grooves to be made higher towards the outermost circumferential direction groove.

The pneumatic tire of the tenth aspect is configured as described above and so exhibits the excellent advantageous effect of enabling the separation distance from lug grooves to be shortened towards the outermost circumferential direction groove and enabling water expelling performance to be raised.

The pneumatic tire of the eleventh aspect is configured as described above and so exhibits the excellent advantageous effect of compensating for disadvantages when running on snow, thereby enabling cornering performance, braking performance and traction performance on snow to be raised The pneumatic tire of the twelfth aspect is configured as described above and so exhibits the excellent advantageous effect of enabling running noise to be reduced.

The pneumatic tire of the thirteenth aspect is configured as described above and so exhibits the excellent advantageous effect of enabling performance on snow to be raised while securing water expelling performance.

The pneumatic tire of the fourteenth aspect is configured as described above and so exhibits the excellent advantageous effect of enabling cornering performance, braking performance and traction performance on snow to be raised

BRIEF DESCRIPTION OF DRAWINGS

FIG. 12 is a table of evaluations of properties such as water expelling performance for Examples of the present invention and Comparative Examples.

BEST MODE FOR CARRYING OUT THE INVENTION

Explanation follows regarding a pneumatic tire 10 according to a first exemplary embodiment of the present invention, with reference to the drawings.

Figure 1:
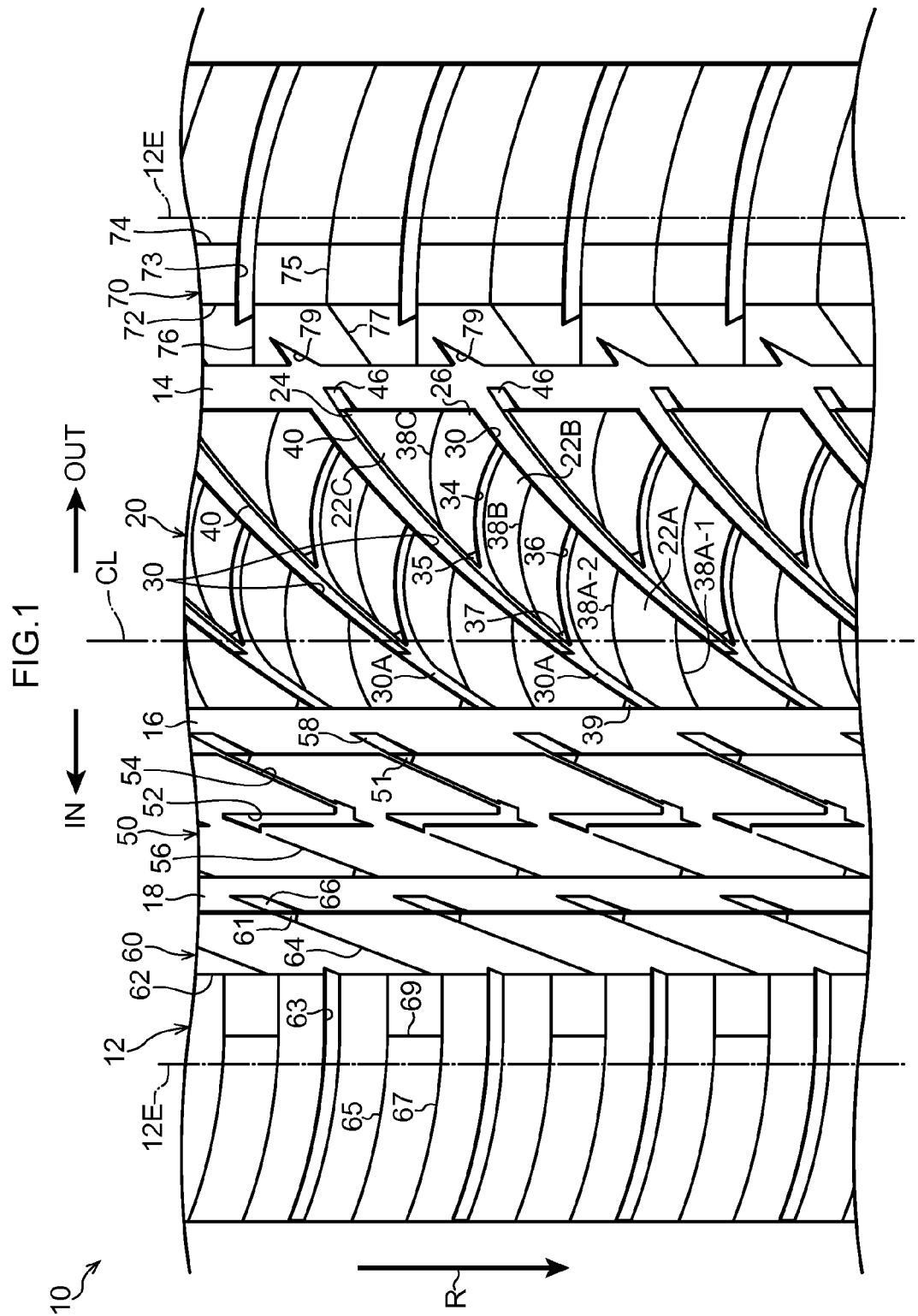
FIG. 1 is a plan view of a tread of a pneumatic tire according to the present exemplary embodiment.

FIG. 1 illustrates a tread 12 of the pneumatic tire 10. Note that a ground contact edge 12E of the tread 12 is defined as the edge when the pneumatic tire 10 is mounted to a standard rim, as defined in the JATMA YEAR BOOK (2009 edition, Japan Automobile Tire Manufacturers Association standards), inflated to an internal pressure of 100% of the air pressure (maximum pressure) corresponding to maximum load capability (load shown in bold type in the internal pressure-load capability chart) in the JATMA YEAR BOOK for the applicable size/ply rating, and loaded to the maximum load capability. Where the location of use or manufacturing location uses TRA standards or ETRTO standards then these respective standards are applied.

The pneumatic tire 10 of the present exemplary embodiment is preferably formed with a left-right asymmetric pattern profile formed on either side of a tire equatorial plane CL, mounted such that the left hand side in the drawings is on the inside when vehicle mounted (as indicated by arrow IN) and the right hand side in the figures is on the outside when vehicle mounted (indicated by arrow OUT). Mounting is preferably such that the tire rotation direction is the direction indicated by arrow R (the diagram bottom side is the dig-in side and the top side in the diagram is the kick-out side). Note that mounting need not always be performed with the above directionality, and mounting may be performed such that IN-OUT of the present exemplary embodiment is reversed, and mounting may be performed such that the front-rear directions are reversed.

In the pneumatic tire 10 of the present exemplary embodiment a first circumferential direction groove 14, a second circumferential direction groove 16 and a third circumferential direction groove 18 are formed in the tread 12 as plural (three in the present exemplary embodiment) circumferential direction grooves extending along the tire circumferential direction.

The first circumferential direction groove 14 is disposed on one side (the outside when vehicle mounted) of the tire equatorial plane CL, and the second circumferential direction groove 16 and the third circumferential direction groove 18 are disposed on the other side (the inside when vehicle mounted) of the tire equatorial plane CL. The second circumferential direction groove 16 is disposed further to the tire equatorial plane CL side than the third circumferential direction groove 18. The first circumferential direction groove 14 is the circumferential direction groove outermost on the OUT side and the third circumferential direction groove is the circumferential direction groove outermost on the IN side.

A land portion 20 is formed between the first circumferential direction groove 14 and the second circumferential direction groove 16. Plural lug grooves 30 are formed along the circumferential direction in the land portion 20 so as to intersect with the first circumferential direction groove 14 and the second circumferential direction groove 16. The lug grooves 30 extend from the first circumferential direction groove 14 towards the second circumferential direction groove 16 sloping downwards to the left such that the angle of slope with respect to the tire equatorial plane gradually increases.

Figure 3:
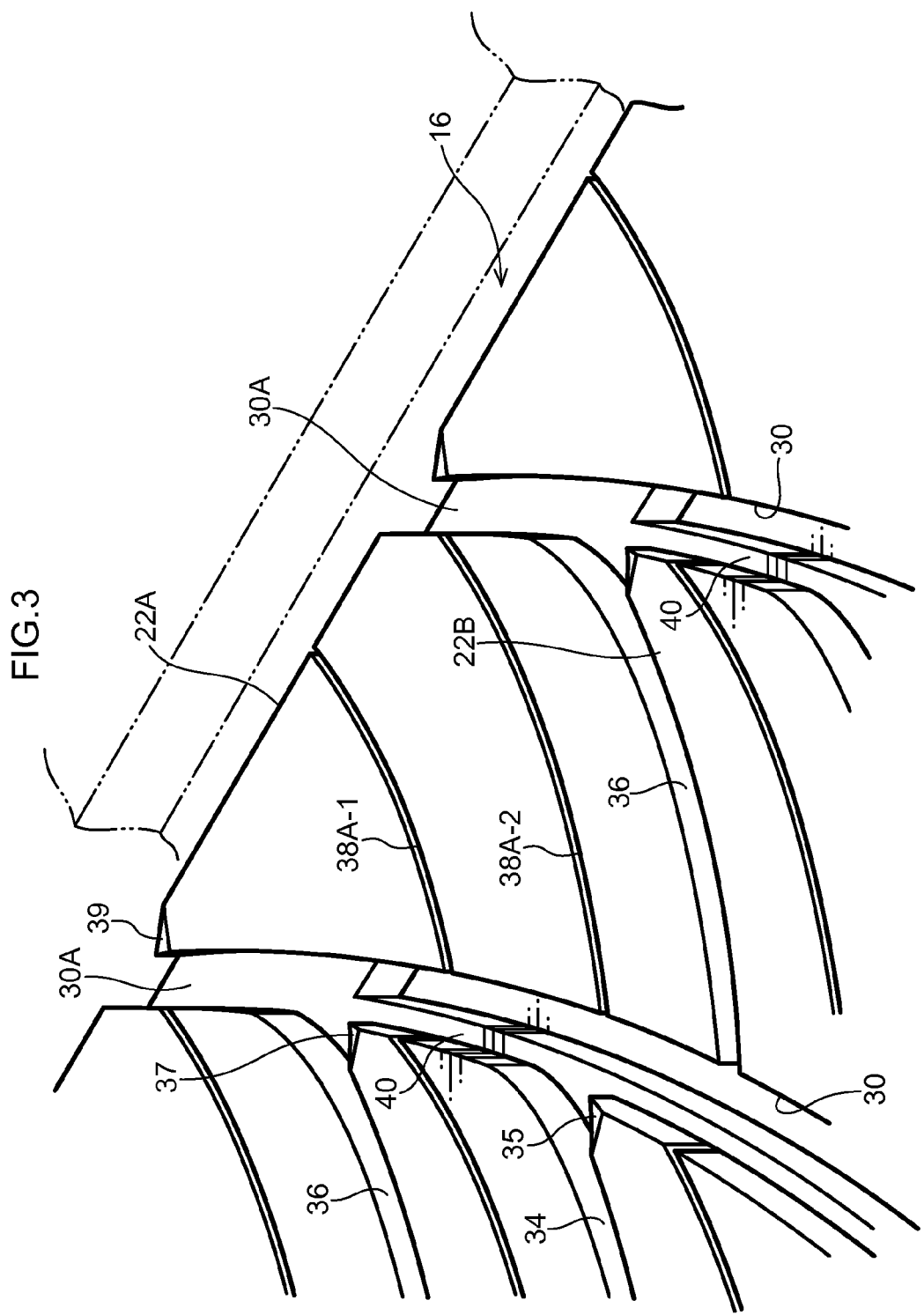
FIG. 3 is an expanded perspective view of a portion of a tread of a pneumatic tire according to the present exemplary embodiment.

As shown in FIG. 3, the lug grooves 30 are configured on the second circumferential direction groove 16 side by shallow grooves 30A that have shallower groove bottoms than on the first circumferential direction groove 14 side. In the present exemplary embodiment the shallow grooves 30A are disposed further to the second circumferential direction groove 16 side than the tire equatorial plane CL. Note that it is not always necessary to form the shallow grooves 30A and the lug grooves 30 may be configured with the same depth across to the second circumferential direction groove 16. The lug grooves 30 may also be configured with a length extending only to a tire width direction intermediate portion of segment land portions 22 so as not to be in communication with the second circumferential direction groove 16. The lug grooves 30 are configured so as to gradually widen in groove width from the second circumferential direction groove 16 side to the first circumferential direction groove 14 side. The lug grooves 30 are formed with a curved profile so as to bulge out slightly towards the top left hand side in the diagram.

The angle of the lug grooves 30 with respect to the tire equatorial plane CL is in the range of 20° to 60°. When the angle is less than 20° concern arises regarding deterioration in drivability due to the segment land portions 22, described later, becoming longer in the tire circumferential direction. However, when the angle of the lug grooves 30 with respect to the tire circumferential direction exceeds 60° then advantages with respect to water expelling performance disappear. The angle of the lug grooves 30 with respect to the tire equatorial plane CL is accordingly preferably set in the range of 20° to 60°.

The segment land portions 22 are configured between adjacent lug grooves 30. Corner portions 24 on the tire circumferential direction kick-out side of the segment land portions 22 (the top side in the diagram) are more acute than corner portions 26 on the dig-in side (the bottom side in the diagram).

Figure 2:
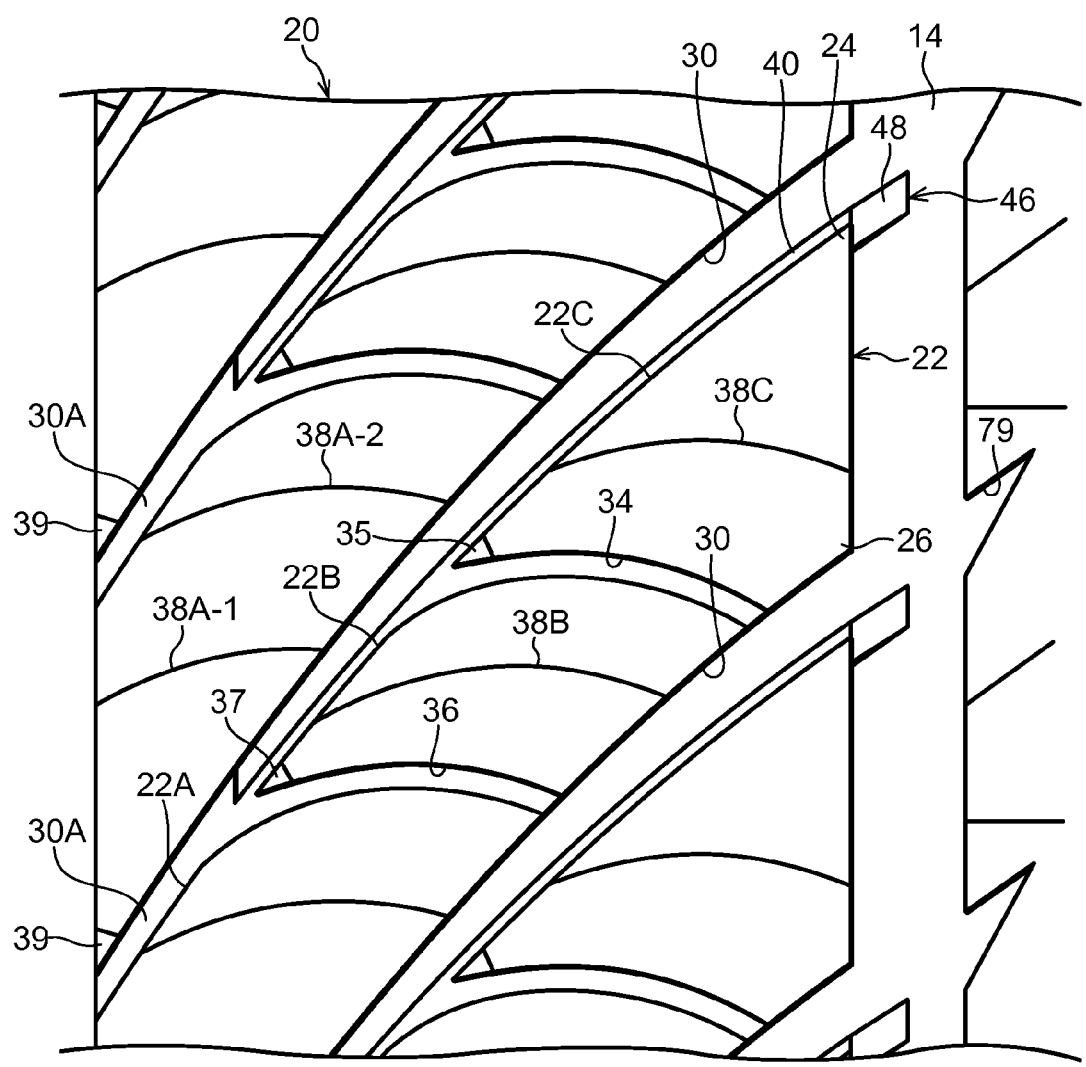
FIG. 2 is an expanded plan view of a portion of a tread of a pneumatic tire according to the present exemplary embodiment.
Figure 5:
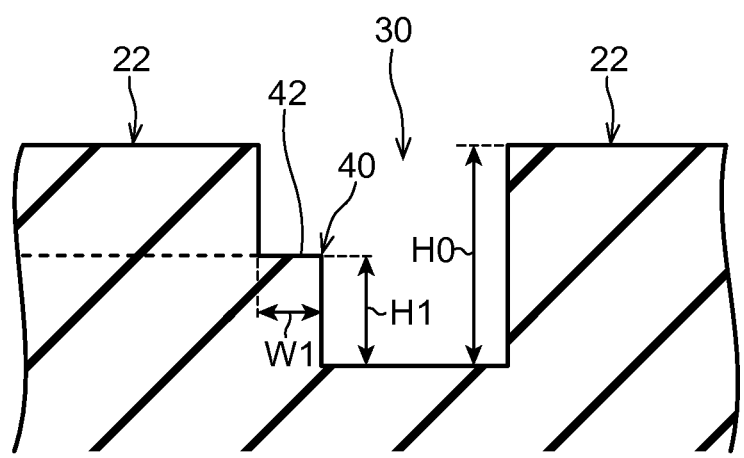
FIG. 5 is a cross-section of a lug groove of a pneumatic tire according to the present exemplary embodiment.

As shown in FIG. 2, a step portion 40 is formed adjacent to the respective lug groove 30 on the corner portion 24 side of the segment land portions 22. The step portion 40 has, as shown in FIG. 5, a step face 42 that is raised from the groove bottom of each of the lug grooves 30 with a lower step than the tire radial direction outermost face of the segment land portions 22. The step portion 40 is formed from the end portion of the segment land portions 22 at the first circumferential direction groove 14 side across to the shallow grooves 30A.

A jutting out width W1 of the step portion 40 into the lug grooves 30 is preferably between 10% and 50% of the average groove width of the lug grooves 30. When the jutting out width of the step portions 40 into the lug grooves 30 is less than 10% advantages with respect to rigidity of the segment land portions 22 disappear. However when 50% is exceeded advantages with respect to water expelling performance disappear. The jutting out width of the step portions 40 into the lug grooves 30 is accordingly preferably from 10% to 50% of the average groove width of the lug grooves 30.

A height H1 of the step portions 40 from the groove bottoms of the lug grooves 30 is preferably from 30% to 70% of a depth H0 of the lug grooves 30 on the first circumferential direction groove 14 side. When the height from the groove bottom of the lug grooves 30 is less than 30% of the depth of the lug grooves 30 on the first circumferential direction groove 14 side then the segment land portions 22 cannot be efficiently suppressed from tilting over. When the height exceeds 70% of depth of the lug grooves 30 on the first circumferential direction groove 14 side the advantage with respect to water expelling performance at the lug grooves 30 disappears. The height H1 of the step portions 40 from the groove bottoms of the lug grooves 30 is accordingly preferably from 30% to 70% of the depth H0 of the lug grooves 30 on the first circumferential direction groove 14 side.

Note that in the present exemplary embodiment, as shown in FIG. 3, the step face 42 of the step portions 40 and the groove bottom of the shallow grooves 30A are in the same plane as each other.

Segmentation shallow grooves 34, 36 are configured in the segment land portions 22 so as to communicate between adjacent lug grooves 30. The segmentation shallow grooves 34, 36 are formed in arc shapes so as to protrude out towards the kick-out side and are disposed substantially parallel to each other and separated from each other. The segmentation shallow grooves 34, 36 are shallower than the first circumferential direction groove 14 side of the lug grooves 30, and the groove bottoms of the segmentation shallow grooves 34, 36 are in the same plane as the step face 42.

The segment land portions 22 are segmented by the segmentation shallow grooves 34, 36 into a first block 22A, a second block 22B and a third block 22C, listed in sequence from the IN side. Two sipes 38A-1, 38A-2 are configured in the first block 22A, a single sipe 38B is configured in the second block 22B, and a single sipe 38C is configured in the third block 22C. The sipes 38A-1, 38A-2, 38B, 38C are substantially parallel to the segmentation shallow grooves 34, 36 and are configured in arc shapes protruding out towards the kick-out direction similarly to the segmentation shallow grooves 34, 36.

The sipe 38A-1 is disposed so as to communicate between the respective second circumferential direction groove 16 and the lug grooves 30. The sipes 38A-2, 38B are disposed so as to communicate between the respective adjacent lug grooves 30. The sipe 38C is disposed so as to communicate between the respective lug grooves 30 and the first circumferential direction groove 14.

Acute corner portions 35, 37 configured between the segmentation shallow grooves 34, 36 and the respective lug groove 30 are beveled. Acute corner portion 39 configured between the respective lug groove 30 and the second circumferential direction groove 16 are also beveled.

Figure 4:
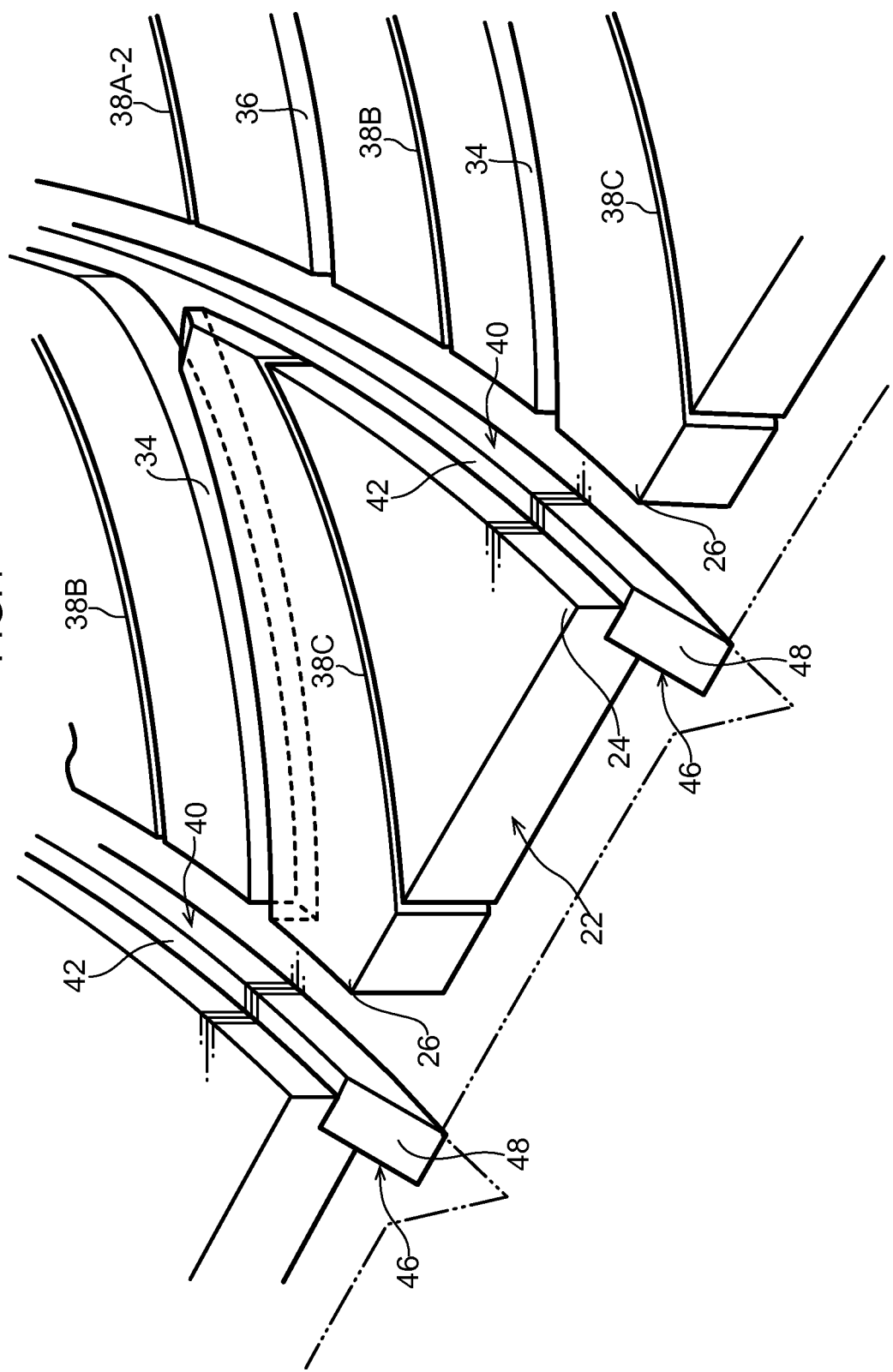
FIG. 4 is an expanded perspective view of a portion of a tread of a pneumatic tire according to the present exemplary embodiment.
Figure 6:
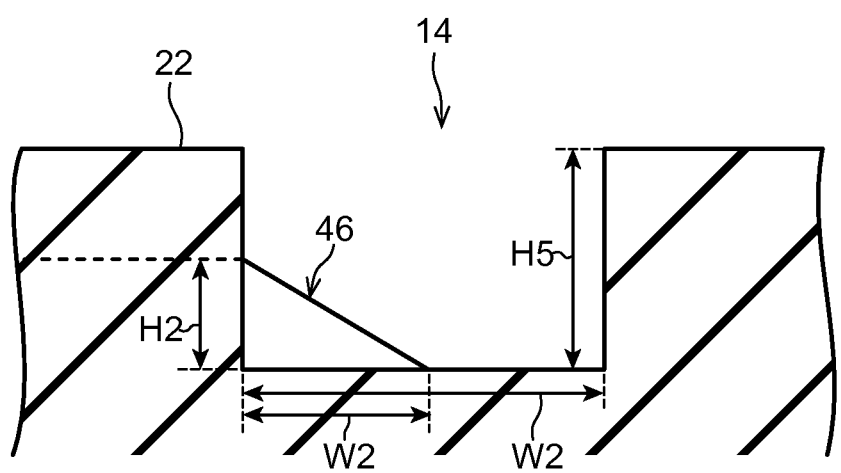
FIG. 6 is a cross-section of a first circumferential direction groove of a pneumatic tire according to the present exemplary embodiment.
Figure 7:
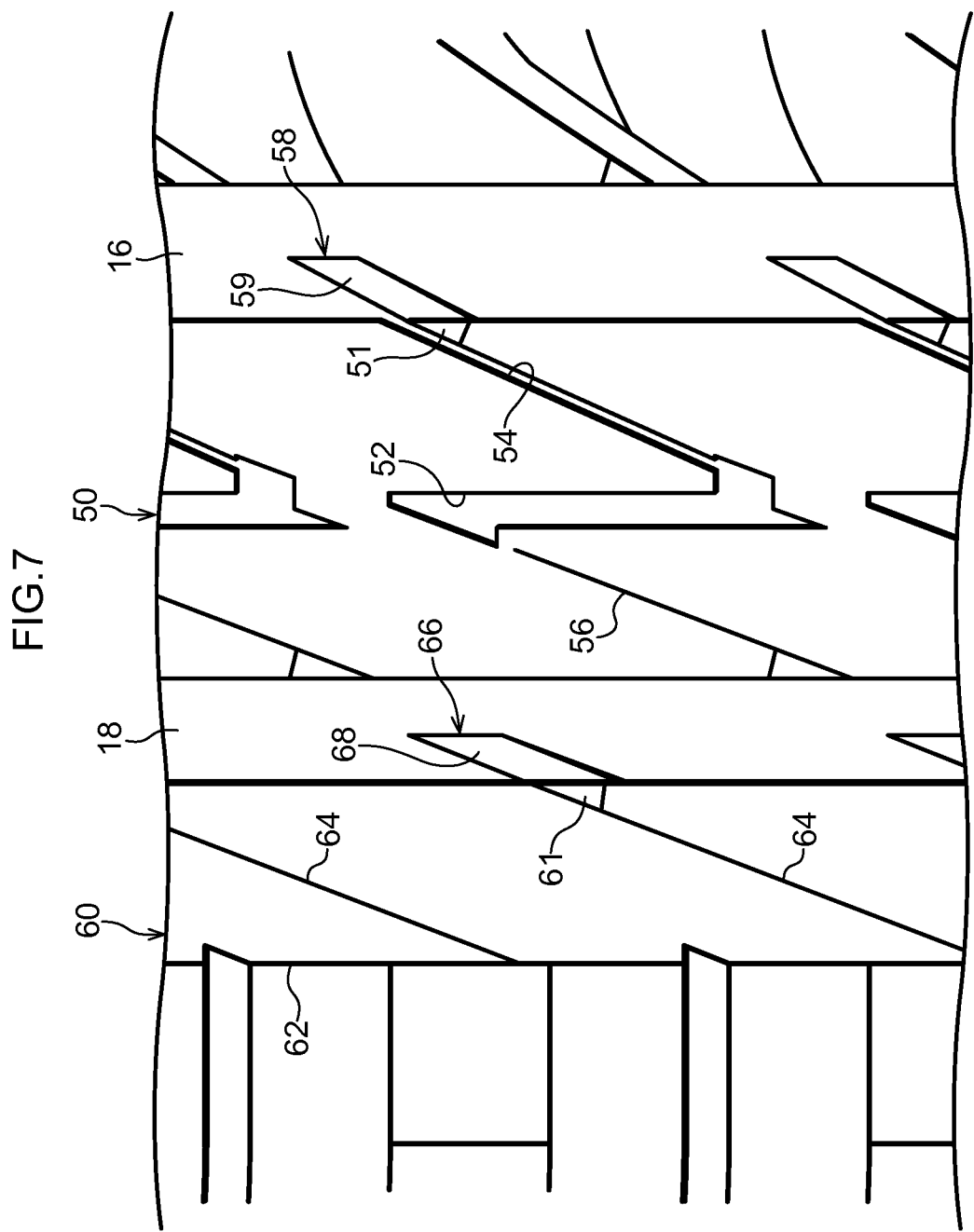
FIG. 7 is an expanded plan view of a portion of a tread of a pneumatic tire according to the present exemplary embodiment.

First projection portions 46 are formed at the corner portion 24 side of the segment land portions 22, projecting into the first circumferential direction groove 14. Each of the first projection portions 46 have, as shown in FIG. 4, a sloping face 48 that slopes from the height of the step face 42 towards the groove bottom of the first circumferential direction groove 14. The kick-out sides of the sloping faces 48 are formed along extension lines from the step faces 42, such that the kick-out sides of the sloping faces 48 project out from the wall face on the first circumferential direction groove 14 side of the segment land portions 22. The first projection portions 46 are, as shown in FIG. 6, formed in triangular shapes as viewed from the tire circumferential direction.

The first projection portions 46 slope with respect to the tire equatorial plane CL in the same direction to that of the lug grooves 30 as viewed from the tread face side. Consequently, the first projection portions 46 not only have a component jutting out in the tire width direction but also have a component jutting out in the tire circumferential direction, enabling not only braking performance and traction performance on snow to be raised, but also for cornering performance to be raised.

A height H2 of the first projection portions 46 from the groove bottom on the wall face side of the segment land portions 22 is preferably from 30% to 70% of a groove depth H5 of the first circumferential direction groove 14. When the height H2 of the first projection portions 46 is less than 30% of the groove depth H5 of the first circumferential direction groove 14 the performance on snow cannot be efficiently improved. However when the height H2 exceeds 70% of the groove depth H5 of the first circumferential direction groove 14 then water expelling performance and performance on snow cannot both be efficiently obtained. The height H2 of the first projection portions 46 from the groove bottom on the segment land portion 22 side is accordingly preferably from 30% to 70% of the groove depth H5 of the first circumferential direction groove 14. The height H2 of the first projection portions 46 from the groove bottom on the segment land portions 22 side is more preferably from 40% to 60% of the groove depth H5 of the first circumferential direction groove 14.

The jutting out width W2 of the first projection portions 46 into the first circumferential direction groove 14 is preferably from 10% to 50% of the groove width W5 of the first circumferential direction groove 14. When the jutting out width W2 of the first projection portions 46 is less than 10% of the groove width W5 of the first circumferential direction groove 14 then the performance on snow cannot be efficiently raised. When the jutting out width W2 exceeds 50% of the groove width W5 of the first circumferential direction groove 14 the water expelling performance and the performance on snow cannot both be efficiently raised. The jutting out width W2 of the first projection portions 46 into the first circumferential direction groove 14 is accordingly preferably from 10% to 50% of the groove width W5 of the first circumferential direction groove 14. The jutting out width W2 of the first projection portions 46 into the first circumferential direction groove 14 is more preferably from 40% to 50% of the groove width W5 of the first circumferential direction groove 14.

Setting the height H2 and the jutting out width W2 as described above results in the circumferential direction proportion occupied by the first projection portions 46 in a cross-section along the same direction as the first projection portions 46 of 10% to 15% of the groove cross-section of the first circumferential direction groove 14.

A second land portion 50 is configured between the second circumferential direction groove 16 and the third circumferential direction groove 18. The second land portion 50 has a narrower width in the tire width direction than the land portion 20. Sound absorption hollow portions 52 are configured at the tire width direction center of the second land portion 50. Each of the sound absorption hollow portions 52 is configured by an elongated groove running along the tire circumferential direction. The sound absorption hollow portions 52 are in communication with sound absorption shallow grooves 54. One end portion of each of the sound absorption shallow grooves 54 is in communication with a dig-in side end portion of the respective sound absorption hollow portion 52, and the other end portion of the sound absorption shallow grooves 54 is in communication with the second circumferential direction groove 16. The sound absorption shallow grooves 54 are sloped with respect to the tire equatorial plane CL such that the second circumferential direction groove 16 side of each of the sound absorption shallow grooves 54 is disposed on the kick-out side.

Sipes 56 are configured on the opposite side of the second land portion 50 to the sound absorption shallow grooves 54, with the sound absorption hollow portions 52 interposed between the sipes 56 and the sound absorption shallow grooves 54. The sipes 56 are configured such that one end portion is in communication with the third circumferential direction groove 18, and the other end portion reaches to the vicinity of the end portion of the sound absorption hollow portions 52 on the kick-out side. The sipes 56 are sloped with respect to the tire equatorial plane CL in the same direction as the sound absorption shallow grooves 54 such that the third circumferential direction groove 18 side of the sipes 56 is disposed on the dig-in side. The sipes 56 are not in communication with the sound absorption hollow portions 52. The volume of the sound absorption hollow portions 52 and the cross-sectional area and length of the sound absorption shallow grooves 54 are set according to the theoretical equations for a Helmholtz resonator to correspond to specific noise frequencies that occur during running, such that noise at these frequencies can be reduced.

Corner portions 51 are formed at the portions where the sound absorption shallow grooves 54 of the second land portion 50 and the second circumferential direction groove 16 intersect with each other. Second projection portions 58 are formed to the corner portions 51 projecting out into the second circumferential direction groove 16. The corner portions 51 are acute angled and beveled.

Figure 8:
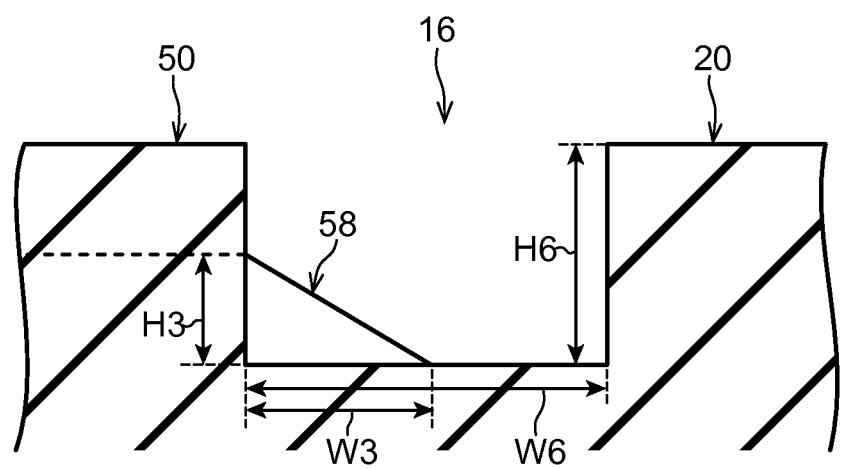
FIG. 8 is a cross-section of a second circumferential direction groove of a pneumatic tire according to the present exemplary embodiment.
Figure 9:
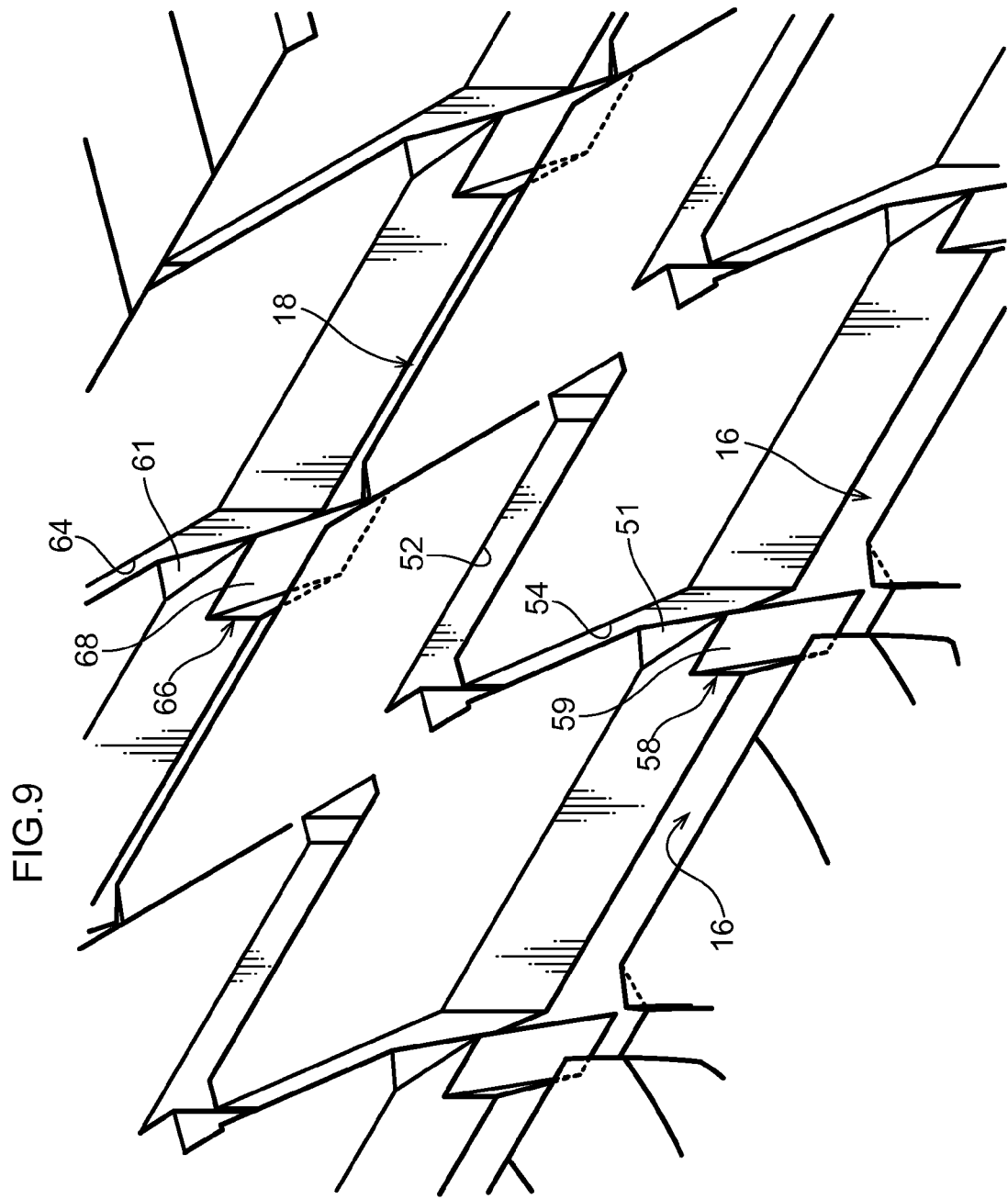
FIG. 9 is an expanded perspective view of a portion of a tread of a pneumatic tire according to the present exemplary embodiment.

The second projection portions 58 have, as shown in FIG. 8 and FIG. 9, sloping faces 59 that slope from an intermediate portion of the wall face of the second land portion 50 on the second circumferential direction groove 16 side towards the groove bottom of the second circumferential direction groove 16. The second projection portions 58 extend in the same direction to the sound absorption shallow grooves 54 and are sloped with respect to the tire equatorial plane CL. The second projection portions 58 are, as shown in FIG. 8, triangular shaped as viewed along the tire circumferential direction.

The second projection portions 58 are sloped with respect to the tire equatorial plane CL as viewed from the tread face side so as to slope in the same direction as the sound absorption shallow grooves 54. Consequently, the second projection portions 58 not only have a component jutting out in the tire width direction but also have a component jutting out in the tire circumferential direction, enabling not only braking performance and traction performance on snow to be raised, but also for cornering performance to be raised.

A height H3 of the second projection portions 58 from the groove bottom on the wall face side of the second land portion 50 is preferably from 30% to 70% of a groove depth H6 of the second circumferential direction groove 16. When the height H3 of the second projection portions 58 is less than 30% of the groove depth H6 of the second circumferential direction groove 16 then the performance on snow cannot be efficiently raised. When height H3 exceeds 70% of the groove depth H6 of the second circumferential direction groove 16 then both water expelling performance and the performance on snow cannot both be achieved. Therefore the height H3 of the second projection portions 58 from the groove bottom on the wall face side of the second land portion 50 is preferably set at 30% to 70% of the groove depth H6 of the second circumferential direction groove 16.

A jutting out width W3 of the second projection portions 58 into the second circumferential direction groove 16 is preferably from 10% to 50% of a groove width W6 of the second circumferential direction groove 16. When the jutting out width W3 of the second projection portions 58 is less than 10% of the groove width W6 of the second circumferential direction groove 16 the performance on snow cannot be efficiently raised. When the jutting out width W3 exceeds 50% of the groove width W6 of the second circumferential direction groove 16 then the water expelling performance and the performance on snow cannot both be efficiently raised. The jutting out width W3 of the second projection portions 58 into the second circumferential direction groove 16 is accordingly preferably from 10% to 50% of the groove width W6 of the second circumferential direction groove 16. Note that the height H3 of the second projection portions 58 from the groove bottom on the wall face side of the second land portion 50 is more preferably from 40% to 60% of the groove depth H6 of the second circumferential direction groove 16.

An IN side shoulder land portion 60 is configured at the shoulder side of the third circumferential direction groove 18. A sipe 62 is configured at a tire width direction central portion of the IN side shoulder land portion 60 and is continuous along the tire circumferential direction. Sipes 64 are configured between the sipe 62 and the third circumferential direction groove 18. The sipes 64 communicate between the sipe 62 and the third circumferential direction groove 18 and are disposed in a direction substantially parallel to the sipes 56 of the second land portion 50. The sipes 64 are disposed such that an end portion on the third circumferential direction groove 18 side is positioned facing the end portion of the sipes 56 on the third circumferential direction groove 18 side.

Figure 10:
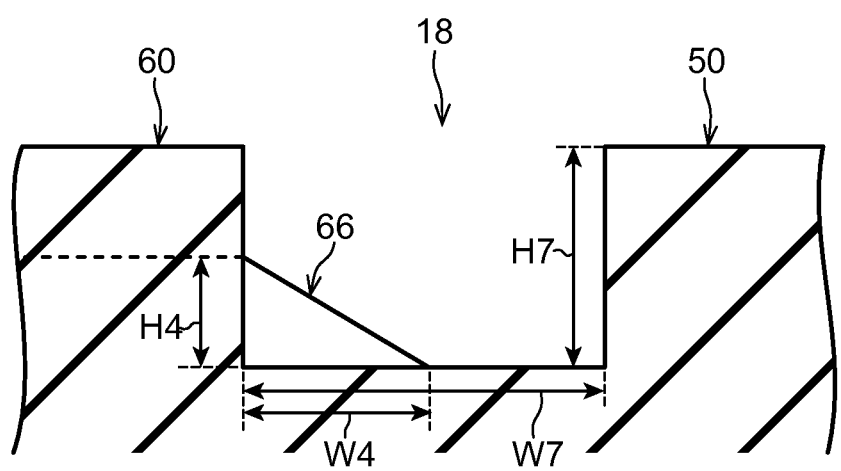
FIG. 10 is a cross-section of a third circumferential direction groove of a pneumatic tire according to the present exemplary embodiment.

Corner portions 61 are formed at the portion where the sipes 64 of the IN side shoulder land portion 60 and the third circumferential direction groove 18 intersect with each other. Third projection portions 66 are formed to the corner portions 61 projecting out into the third circumferential direction groove 18. The corner portions 61 are acute angled and are beveled. The third projection portions 66 have, as shown in FIG. 9 and FIG. 10, sloping faces 68 that slope from an intermediate portion of the wall face of the IN side shoulder land portion 60 on the third circumferential direction groove 18 side towards the groove bottom of the third circumferential direction groove 18. The third projection portions 66 extend out in the same direction to the sipes 64, and are sloped with respect to the tire equatorial plane CL. The third projection portions 66 are, as shown in FIG. 10, triangular shaped as viewed along the tire circumferential direction.

The third projection portions 66 are sloped with respect to the tire equatorial plane CL in the same direction to the sipes 64, as viewed from the tread face side. Consequently, the third projection portions 66 not only have a component jutting out in the tire width direction but also have a component jutting out in the tire circumferential direction, enabling not only braking performance and traction performance on snow to be raised, but also for cornering performance to be raised.

End portion shallow grooves 63 are configured further to the shoulder side than the sipe 62. The end portion shallow grooves 63 are disposed so as to extend along the tire width direction. Two sipes 65, 67 are configured between the respective adjacent end portion shallow grooves 63. The sipes 65, 67 are in communication with each other through sipes 69 disposed along the tire circumferential direction.

A height H4 of the third projection portions 66 from the groove bottom on the wall face side of the IN side shoulder land portion 60 is preferably from 30% to 70% of a groove depth H7 of the third circumferential direction groove 18. When the height H4 of the third projection portions 66 is less than 30% of the groove depth H7 of the third circumferential direction groove 18 then performance on snow cannot be efficiently raised. When the height H4 exceeds 70% of the groove depth H7 of the third circumferential direction groove 18 then the water expelling performance and the performance on snow cannot both be efficiently achieved. The height H4 of the third projection portions 66 from the groove bottom on the wall face side of the IN side shoulder land portion 60 is accordingly preferably from 30% to 70% of the groove depth H7 of the third circumferential direction groove 18. Note that although the height H4 of the third projection portions 66 from the groove bottom on the wall face side of the IN side shoulder land portion 60 is preferably from 30% to 70% of the groove depth H7 of the third circumferential direction groove 18 it is more preferably from 40% to 60% thereof.

A jutting out width W4 of the third projection portions 66 into the third circumferential direction groove 18 is preferably from 10% to 50% of a groove width W7 of the third circumferential direction groove 18. When the jutting out width W4 of the third projection portions 66 is less than 10% of the groove width W7 of the third circumferential direction groove 18 then the performance on snow cannot be efficiently raised. When the jutting out width W4 exceeds 50% of the groove width W7 of the third circumferential direction groove 18 the water expelling performance and the performance on snow cannot both be efficiently raised. The jutting out width W4 of the third projection portions 66 into the third circumferential direction groove 18 is accordingly preferably from 10% to 50% of the groove width W7 of the third circumferential direction groove 18. The jutting out width W4 of the third projection portions 66 into the third circumferential direction groove 18 is more preferably from 40% to 50% of the groove width W7 of the third circumferential direction groove 18.

Setting the height H4 and the jutting out width W4 as described above results in the proportion occupied by the third projection portions 66 in a cross-section along the same direction as that of the third projection portions 66 with respect to the groove cross-section of the third circumferential direction groove 18 of 10% to 15%.

An OUT side shoulder land portion 70 is configured at the shoulder side of the first circumferential direction groove 14. Sipes 72, 74 are configured in a tire width direction central portion of the OUT side shoulder land portion 70 so as to be continuous along the tire circumferential direction and separated from each other.

End portion shallow grooves 73 are configured from slightly further to the first circumferential direction groove 14 side than the sipe 72 towards the shoulder side. The end portion shallow grooves 73 are disposed so as to extend along the tire width direction. Sipes 75 are configured between the respective adjacent end portion shallow grooves 73.

Sipes 76, 77 are configured between the sipe 72 and the first circumferential direction groove 14. The sipes 76 are configured along the extension line of the end portion shallow grooves 73 in the same direction as the end portion shallow grooves 73. The sipes 77 are disposed in a direction substantially parallel to the lug grooves 30, with one end portion of each of the sipes 77 in communication with an end portion of the respective sipe 75 and the sipe 72, and the other end portion is in communication with the first circumferential direction groove 14.

A cutout portion 79 is configured at a position facing the lug grooves 30 on the first circumferential direction groove 14 side of the OUT side shoulder land portion 70.

Operation

Explanation follows regarding operation of the pneumatic tire 10 of the present exemplary embodiment. In the pneumatic tire 10 of the present exemplary embodiment, the first circumferential direction groove 14, the second circumferential direction groove 16 and the third circumferential direction groove 18 are disposed in the tread 12 as three circumferential direction grooves extending along the tire circumferential direction. Basic water expelling performance and straight line stability in wet and dry is thereby secured.

The lug grooves 30 are disposed in the tread 12 sloped at an angle of 20° to 60° with respect to the tire equatorial plane. Hence a higher water expelling performance than that of a conventional all season tire can be exhibited. Noise can also be suppressed.

The lug grooves 30 are configured with a groove width that widens towards the first circumferential direction groove 14, enabling higher water expelling performance towards the first circumferential direction groove 14.

The lug grooves 30 are also curved in a direction (a direction in which the angle of the corner portions 24 gets larger) such that the angle of slope with respect to the tire equatorial plane gradually increases on progression towards the first circumferential direction groove 14 side. The separation distance therebetween can accordingly be made shorter on progression from the lug grooves 30 towards the first circumferential direction groove 14 in comparison to cases in which lug grooves are a straight line shape, enabling higher water expelling performance.

The step portions 40 are also formed in the segment land portions 22 on the corner portions 24 side and adjacent to the lug grooves 30, thereby enabling the rigidity of the segment land portions 22 to be raised and tilting over thereof to be suppressed while still securing water expelling performance with the lug grooves 30.

Note than while the step portions 40 are only formed on the corner portions 24 side in the present exemplary embodiment, configuration may be made with step portions configured similarly to the step portions 40 also formed in the vicinity of the ends of the segment land portions 22 on the dig-in side.

Due to the shallow grooves 30A at the second circumferential direction groove 16 side of the land portion 20 being shallower to the groove bottom than on the first circumferential direction groove 14 side, the strength of the portion of the tread 12 in the vicinity of the tire equatorial plane CL (the portion experiencing high ground contact pressure) can be raised, and the strength of the segment land portions 22 can be efficiently raised.

In the present exemplary embodiment the segmentation shallow grooves 34, 36 are also configured in the segment land portions 22, enabling the cornering performance, braking performance and traction performance on snow to be raised. Due to the segmentation shallow grooves 34, 36 being shaped in arcs, a longer communication groove can be formed in comparison to cases in which the segmentation shallow grooves 34, 36 are shaped as straight lines, and the cornering performance, braking performance and traction performance on snow can be raised further.

Note that while in the present exemplary embodiment the segmentation shallow grooves 34, 36 are configured shallower than the depth of the lug grooves 30 on the first circumferential direction groove 14 side, configuration may be made with their depths the same as the depth of the lug grooves 30 on first circumferential direction groove 14 side. In particular, an edge can be formed while still securing the rigidity of the segment land portions 22 by forming the shallow grooves as in the present exemplary embodiment.

In the present exemplary embodiment the first projection portions 46, the second projection portions 58 and the third projection portions 66 are provided respectively to the first circumferential direction groove 14, the second circumferential direction groove 16 and the third circumferential direction groove 18 that extend along the tire circumferential direction. The traction performance and braking performance on snow can thereby be raised in comparison to cases in which these projection portions are not provided. At the same time the groove volume of the first circumferential direction groove 14, the second circumferential direction groove 16 and the third circumferential direction groove 18 can be secured, enabling water expelling performance to also be secured.

The first projection portions 46 are provided on the corner portions 24 side of the segment land portions 22, and so the rigidity of the corner portions 24 can be reinforced.

Note that while in the present exemplary embodiment the first projection portions 46, the second projection portions 58 and the third projection portions 66 are provided respectively to the first circumferential direction groove 14, the second circumferential direction groove 16 and the third circumferential direction groove 18, configuration may be made with projection portions provided to any one or two of these grooves.

In the present exemplary embodiment the sound absorption grooves 52 are also configured to the second land portion 50 and so a higher noise suppression effect can be obtained.

Figure 11:
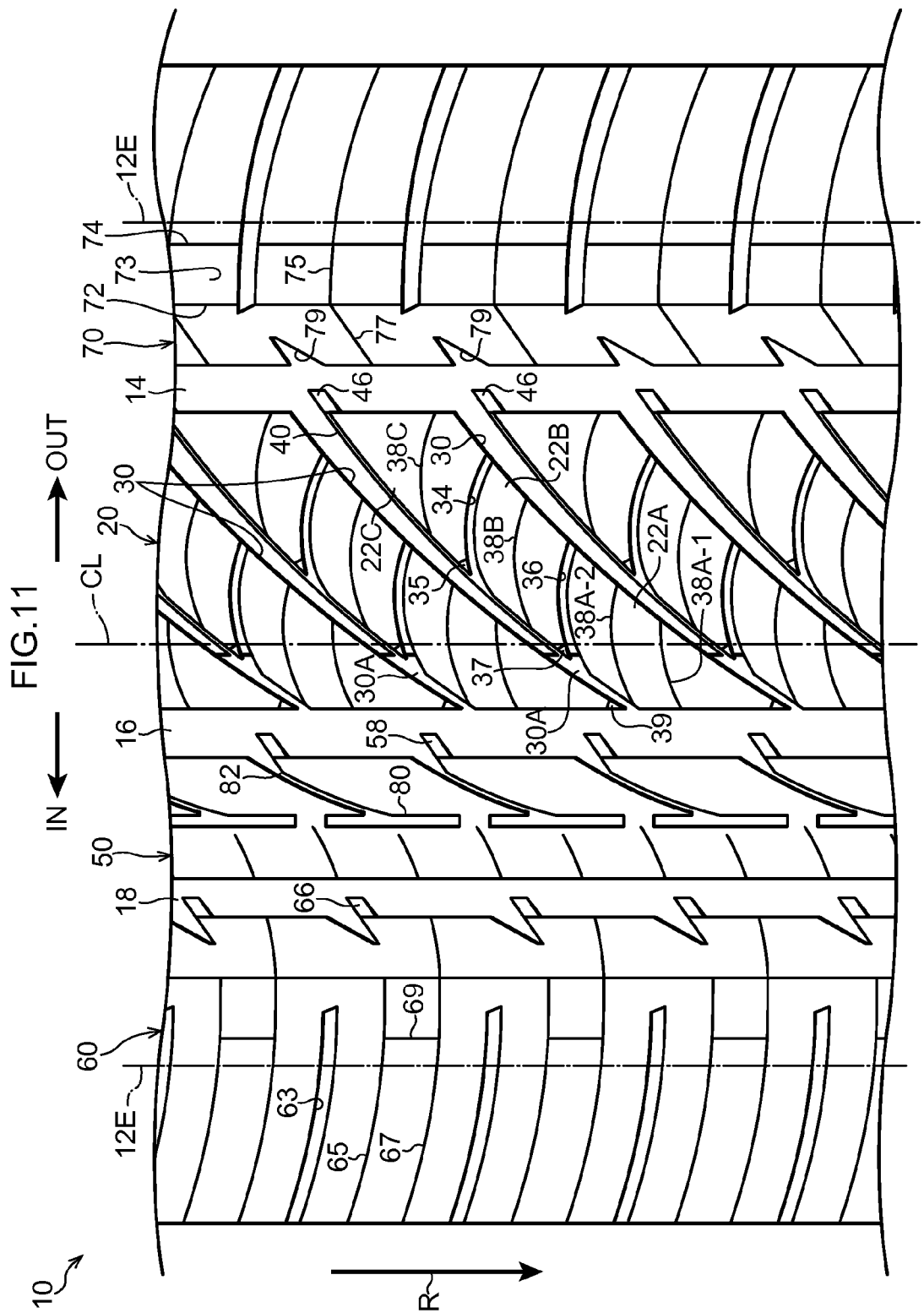
FIG. 11 is a plan view of a tread of a pneumatic tire according to a modified example of the present exemplary embodiment.

Note that sound absorption hollow portions 80 as illustrated in FIG. 11 may be configured to the second land portion 50 in place of the sound absorption hollow portions 52 of the present exemplary embodiment. Grooves 82 may also be configured extending from intermediate portions of the sound absorption hollow portions 80 towards the kick-out direction side and in communication with the second circumferential direction groove 16.

Example

Evaluation is performed for performance on snow and steering stability performance for the pneumatic tire according to the exemplary embodiment as described above (Example) and a pneumatic tire with a tread as disclosed in Japanese Patent No. 322953 (Comparative Example 0). Note that the performance on snow is measured by vehicle mounted instruments on a flat straight line road test course, measuring the acceleration on snow and the braking distance on snow. The steering stability performance is assessed by an evaluation of "feeling" by a test driver on a bumpy circuit road (dry). In each case evaluation is performed as an index with the comparative example evaluated as 100. The higher the index value the higher the performance.

The tire size is 225/45R17 in each case.

TABLE 1

| | Performance on Snow | Steering Stability Performance |
|---|---|---|
| Comparative Example 0 | 100 | 100 |
| Example | 120 | 120 |

It is clear from Table 1 that the Example pneumatic tire has high performance for both performance on snow and steering stability performance.

Analysis is performed for water expelling performance and performance on snow for circumferential direction grooves equipped with the first projection portions 46 of the present exemplary embodiment (Examples 1 to 4) and for circumferential direction grooves equipped with projection portions of other shapes (Comparative Examples 1 to 10). Evaluation is as an index with the evaluation of the Comparative Example 10, not provided with projection portions, set at 100, and higher index values indicating higher performance. The relationships between the circumferential direction grooves and the projection portions and the cross-section profile of the projection portions are as shown in FIG. 12.

As shown in FIG. 12, the Comparative Examples 1 to 9 have high performance on snow, however the index values for water expelling performance are 97.0 or less. The Examples 1 to 4 are capable of also achieving high evaluations for performance on snow while still maintaining water expelling performance of 98.0 or greater.

The invention claimed is:

1. A pneumatic tire comprising:
   a plurality of circumferential direction grooves provided to a tread and extending along the tire circumferential direction;
   a land portion configured between an outermost circumferential direction groove disposed furthest to the outside in one tire width direction, and a second circumferential direction groove that is adjacent to the outermost circumferential direction groove;
   a plurality of lug grooves that extend from the outermost circumferential direction groove towards the tire equatorial plane side and are disposed sloped with respect to the tire equatorial plane at intervals along the tire circumferential direction, the lug grooves being configured so as to communicate with the outermost circumferential direction groove and with the second circumferential direction groove, and the second circumferential direction groove sides of the lug grooves are configured to be shallower than at the outermost circumferential direction groove side;
   a step portion that is adjacent to the lug groove, that has a step face that is raised from the groove bottom of the lug groove by a lower amount than the tread surface of the segment land portion, and that is formed from the outermost circumferential direction groove towards the tire equatorial plane side, at the side of segment land portions arising from the land portion being segmented in the tire circumferential direction by the lug grooves, where a corner portion of the segment land portions on the outermost circumferential direction groove side is an acute angle;
   arc shaped communication grooves formed in the segment land portions, the communication grooves communicating between the lug grooves adjacent to each other in the tire circumferential direction, and a plurality of arc shaped communication grooves being formed in the each of the segment land portions; and
   a second land portion formed between the second circumferential direction groove and the circumferential direction groove on the opposite side to the outermost circumferential direction groove,
   wherein a plurality of sound absorption sections, each comprising a resonance hollow portion and a communication groove portion that communicates between the resonance hollow portion and the second circumferential direction groove, are formed in the second land portion along the tire circumferential direction, and
   wherein:
   the resonance hollow portion has greater circumferential direction dimension than tire width direction dimension;
   a groove width of the resonance hollow portion is wider than a groove width of the communication groove portion;
   for each resonance hollow portion, one communication groove portion that communicates between the each resonance hollow portion and the second circumferential direction groove is provided; and
   a second projection portion is formed at a groove wall of the second circumferential direction groove at a side of the second land portion at which the communication groove portion makes an acute angle with the second circumferential direction groove.

2. The pneumatic tire of claim 1 wherein the depth of the communication grooves is shallower than the depth of the lug grooves.

3. The pneumatic tire of claim 1 wherein the lug grooves are sloped at 20° to 60° with respect to the tire equatorial plane.

4. The pneumatic tire of claim 1 wherein a jutting out width of the step portion into the lug groove is from 10% to 50% of the average groove width of the lug grooves.

5. The pneumatic tire of claim 1 wherein a height of the step portion from the groove bottom of the lug groove is from 30% to 70% of the depth of the lug groove at the outermost circumferential direction groove side.

6. The pneumatic tire of claim 1 wherein three circumferential direction grooves are formed in the tread, the outermost circumferential direction groove is disposed on one side of the tire equatorial plane and the other two circumferential direction grooves are disposed on the other side of the tire equatorial plane.

7. The pneumatic tire of claim 1 wherein the lug grooves are configured such that the groove width widens on progression towards the outermost circumferential direction groove.

8. The pneumatic tire of claim 1 wherein the lug grooves are curved in a direction such that the angle of slope with respect to the tire equatorial plane gradually increases towards the outermost circumferential direction groove.

9. The pneumatic tire of claim 1 wherein the communication grooves are shallower than the outermost circumferential direction groove side of the lug grooves.

10. The pneumatic tire of claim 1 wherein:
at least one of the plurality of circumferential direction grooves is provided with projection portions that project out from a side wall of the row of land portions at one side and have a sloping face from the side wall to the groove bottom of the circumferential direction groove; and
the height of the projection portions is from 30% to 70% of the groove depth of the circumferential direction groove provided with the projection portions, and the jutting out width of the projection portions into the circumferential direction groove is from 10% to 50% of the groove width of the circumferential direction groove provided with the projection portions.

11. The pneumatic tire of claim 10 wherein the projection portions slope in the same direction as the lug grooves with respect to the tire equatorial plane.

* * * * *